(12) United States Patent
Campion et al.

(10) Patent No.: US 6,249,813 B1
(45) Date of Patent: Jun. 19, 2001

(54) AUTOMATED METHOD OF AND APPARATUS FOR INTERNET ADDRESS MANAGEMENT

(75) Inventors: Thomas R. Campion, Cary; Michael A. SoRelle, Durham, both of NC (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/129,819

(22) Filed: Aug. 6, 1998

(51) Int. Cl.[7] ........................ G06F 15/177; G06F 15/173
(52) U.S. Cl. ........................ 709/222; 709/220; 709/223
(58) Field of Search ...................... 709/245, 222, 709/223, 220, 226; 370/254; 711/173, 203

(56) References Cited

U.S. PATENT DOCUMENTS

| | | | |
|---|---|---|---|
| 5,150,464 | * 9/1992 | Sidhu et al. | 709/222 |
| 5,796,954 | * 8/1998 | Hanif et al. | 709/231 |
| 5,854,901 | * 11/1998 | Cole et al. | 709/245 |
| 5,872,524 | * 2/1999 | Iida | 340/825.25 |
| 5,978,568 | * 11/1999 | Abraham et al. | 709/224 |
| 6,009,103 | * 12/1999 | Woundy | 370/401 |
| 6,011,782 | * 1/2000 | DeSimone et al. | 370/260 |
| 6,012,066 | * 1/2000 | Discount et al. | 707/103 |
| 6,012,088 | * 1/2000 | Li et al. | 709/219 |
| 6,028,848 | * 2/2000 | Bhatia et al. | 370/257 |
| 6,115,545 | * 9/2000 | Mellquist | 709/220 |

OTHER PUBLICATIONS

Hubbard et al., "Internet Registry IP Allocation Guidelines", Internet RFC 2050, Nov. 1996.*
Schoettle, "IP–Address Management on LAN", Core Technologies, Feb. 1996.*
Enck, Windows NT Server 4.0 Administrator's Desk Reference, Que, Macmillan Computer Publishing, chapter 22, Nov. 1997.*
Semeria, "Understanding IP Addressing: Everything You Even Wanted To Know", NSD Marketing, 3Com Corporation, pp. 1–45, Apr. 1996.*
Hui et al., "A dynamic IP addressing system for Internet telephony applications", Computer Communications 21 (1998), pp. 254–266.*
rfc1541, Dynamic Host Configuration Protocol, http://www.cis.ohio–state.edu/htbin/rfc/rfc1541.html, pp. 1–39, Oct. 1993.*

* cited by examiner

Primary Examiner—Dung C. Dinh
Assistant Examiner—Bradley Edelman

(57) ABSTRACT

An automated method of and apparatus for Internet address management is provided. The method and apparatus receive requests for a host name/IP address assignment and automatically performs error checking on the request. The method and apparatus determine if there are available addresses in the address space for the requested subnet and if the new host name meets the requisite criteria for a valid host name. Once error checked, the requested amount of IP addresses are created and inspected for uniqueness. Individual host names are created and inspected for uniqueness prior to being assigned to respective IP addresses. Once assigned, the new host names/IP addresses are entered into the DNS database. Accordingly, the automated method and apparatus is less time consuming while being free from errors arising in prior Internet address management methods.

46 Claims, 7 Drawing Sheets

AUTOMATED METHOD OF AND APPARATUS FOR INTERNET ADDRESS MANAGEMENT

BACKGROUND OF THE INVENTION

This invention relates to the field of computer networks and, in particular, to an automated method of Internet address management for an Internet Protocol (IP) routed network.

TCP/IP (Transmission Control Protocol/Internet Protocol) is fast becoming the dominant communication protocol in the field of computer networks and telecommunications. The TCP/IP protocol divides files that are to be transmitted across a network into small data packets. The small packets are transmitted, and possibly routed through numerous networks, and then reassembled once they arrive at the intended receiver of the transmission. The TCP/IP protocol defines what the packets look like, what information they must contain, how they are to be transmitted, received and reassembled. TCP/IP is the standard protocol used by computers connected to the Internet that allows Internet users to communicate world-wide even over diverse transmission networks. TCP/IP is also used in local area networks (LAN), wide area networks (WAN), and other computer networks even if they are not connected to the Internet. Generally, these networks are referred to as "IP routed networks."

The TCP/IP protocol utilizes IP addresses to identify individual computers, peripheral devices or users (collectively referred to as "nodes") connected to an IP routed network. An IP address includes four numerical parts often referred to as "bytes," or "octets," separated by periods (that is, "octet1.octet2.octet3.octet4"). Each octet represents an 8-bit binary number that can have a numerical value ranging from 0 to 255 (0 and 255 are typically not used because they are reserved). Thus, for example, one IP address might be 56.1.250.1 while a second IP address might be 200.10.1.100.

Every IP address includes a network portion to identify the network and a node portion to identify a particular node of the network. There are three main classes of IP addresses. The class A IP address consists of one octet (octet1) representing the network portion and three octets (octet2 to octet4) representing nodes (also referred to as "hosts") of the network. To help route information quickly, the upper four bits of octet1 are used to distinguish between the three classes. Accordingly, the class A IP address range is limited to 127 available networks (octet1 having a value between 1 and 127). Although there are only a few class A network addresses, each class A network can have over 16 million node addresses. The class B IP address consists of two octets (octet1 and octet2) representing the network portion and two octets (octet3 and octet4) representing nodes. There are about 65 thousand class B network addresses available (octet1 having a value between 128 and 191) with each class B network having over 65 thousand nodes. The class C IP address consists of three octets (octet1 to octet3) representing the network portion and only one octet (octet4) representing nodes. There are approximately 2 million class C network addresses (octet1 having a value between 192 to 223) with each class C network having 254 nodes. Two other classes, D and E, which are not discussed further utilize the remaining available addresses (that is, octet1 having a value greater than 223).

Since people found remembering the numbers in an IP address assigned to individual computers, or other equipment, extremely burdensome and difficult, a Domain Name System (DNS) was created in 1984. DNS is a system wherein IP addresses are mapped to names. DNS names are divided into domains and are constructed hierarchically in an inverted tree structure. FIG. 1 illustrates an exemplary structure of a domain name space wherein each "leaf" on the tree 10 represents a domain or subdomain. Every domain, such as "mci.com" (which is actually a subdomain of the domain "com"), stores local host information about its domain in a local name server. The Internet, for example, uses several huge DNS servers to coordinate the local name servers and provide access to the Internet.

A host named "node1" residing in the "mci.com" domain, for example, would have the host name (also referred to as a "domain name") "node1.mci.com". That is, a host name is made up of labels assigned to each leaf on the path from the root of the tree to the host. A DNS database is responsible for cross-referencing the host to its corresponding IP address. Each time an Internet user, for example, attempts to access a host name such as "node1.mci.com," for example, a DNS name server uses the database to translate the name into its assigned IP address.

When a new host or node is added to an existing network, both a host name and an IP address must be assigned to that host and entered into the DNS database. Generally, networks can be divided into subnetworks or "subnets." The term "subnet" as used herein refers to a group of terminals or computers within a network. Assuming, for example, the network has a class B address, the octet3 and octet4 portions of the IP address could be used to address the subnet of that network. That is, the class B network could have 254 subnets (octet3) each having 254 addressable nodes (octet4). If the network has a class A address, its class B and C portions (i.e., octet2, octet3 and octet4) could be used to address subnets of that network. To assign a new host name/IP address to a subnetwork, there must be an available subnet IP address within the address space reserved for the requested network. Otherwise, a new subnet address space must be created for that network.

Currently, when a DNS administrator receives a request to create a new host name and an associated IP address, the administrator must manually inspect the DNS database to determine if there are any available addresses in the address space reserved for the requested subnet. The administrator must then ensure that both the newly created IP addresses and host names are unique, since duplicate addresses or host names would cause havoc to the network. If there is no available subnet addresses for the requested subnet, the administrator must start a new subnet address space within the IP address range of the network. Once the host name/IP address assignment is completed and entered into the local DNS database, the information will be passed to a higher level DNS server where a process known as "resolution" is performed to ensure the validity of the host name and IP address (when the network is connected to a larger network such as the Internet).

Currently, the DNS assignment steps of inspection of the DNS database and the creation of host names and IP addresses are all being performed manually. This means that an administrator of the network must receive a request for a host name/IP address assignment, find an available IP address for the requested subnet, and create a host name (or implement the requested host name) that has not already been assigned to another requester. This process takes an undesirable amount of time and has a high potential for human error. In addition, since DNS administrators often receive requests in batches (that is, more than one new name/IP address assignment is requested at a time), the above tasks become much more complicated and even more time consuming. The database must be inspected to find multiple available IP addresses which may be spread throughout the ever increasing database. Sometimes, an administrator may determine that creating a new subnet address space is easier than hunting through the database to find available addresses. Although this ensures that unique IP addresses are being created, this wastes available addresses in the original subnet address space.

As stated above, the administrator must also ensure that the new host name is unique. In addition, some organizations place restrictions or have required formats for creation of host names used in their network. For example, an organization may want a city or state name incorporated into the host name. That is, if the host named node1 resided in Durham, N.C., for example, the organization may want the host name to be "durhnode1.mci.com." Thus, placing an additional burden on the administrator to ensure validity as well as uniqueness of the new host name. Errors resulting from the manual inspection, creation and entry of the new host name/IP address assignments frequently occur. These errors can lead to network problems and poor customer service (if the DNS services are being provided for a customer's network). In addition, the process is too time consuming even when performed error free.

BRIEF SUMMARY OF THE INVENTION

The invention provides an automated method of and apparatus for Internet address management. The invention receives requests for a host name/IP address assignment and automatically performs error checking on the request. The invention determines if there are available addresses in the address space for the requested subnet, and if the new host name meets the requisite criteria for a valid host name. Once error checked, the requested amount of IP addresses are created and inspected for uniqueness. Individual host names are created and inspected for uniqueness prior to being assigned to respective IP addresses. Once assigned, the new host names/IP addresses are entered into the DNS database. Accordingly, the automated method and apparatus is less time consuming while being free from errors arising in prior Internet address management methods.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

The invention will be described in detail with reference to the preferred embodiments illustrated in FIGS. 1–7b. The invention is described herein in its preferred application to an Internet Protocol (IP) routed network. The invention, however, may be equally applicable to any other type of network requiring assignment of addresses of nodes in the network.

Figure 1:
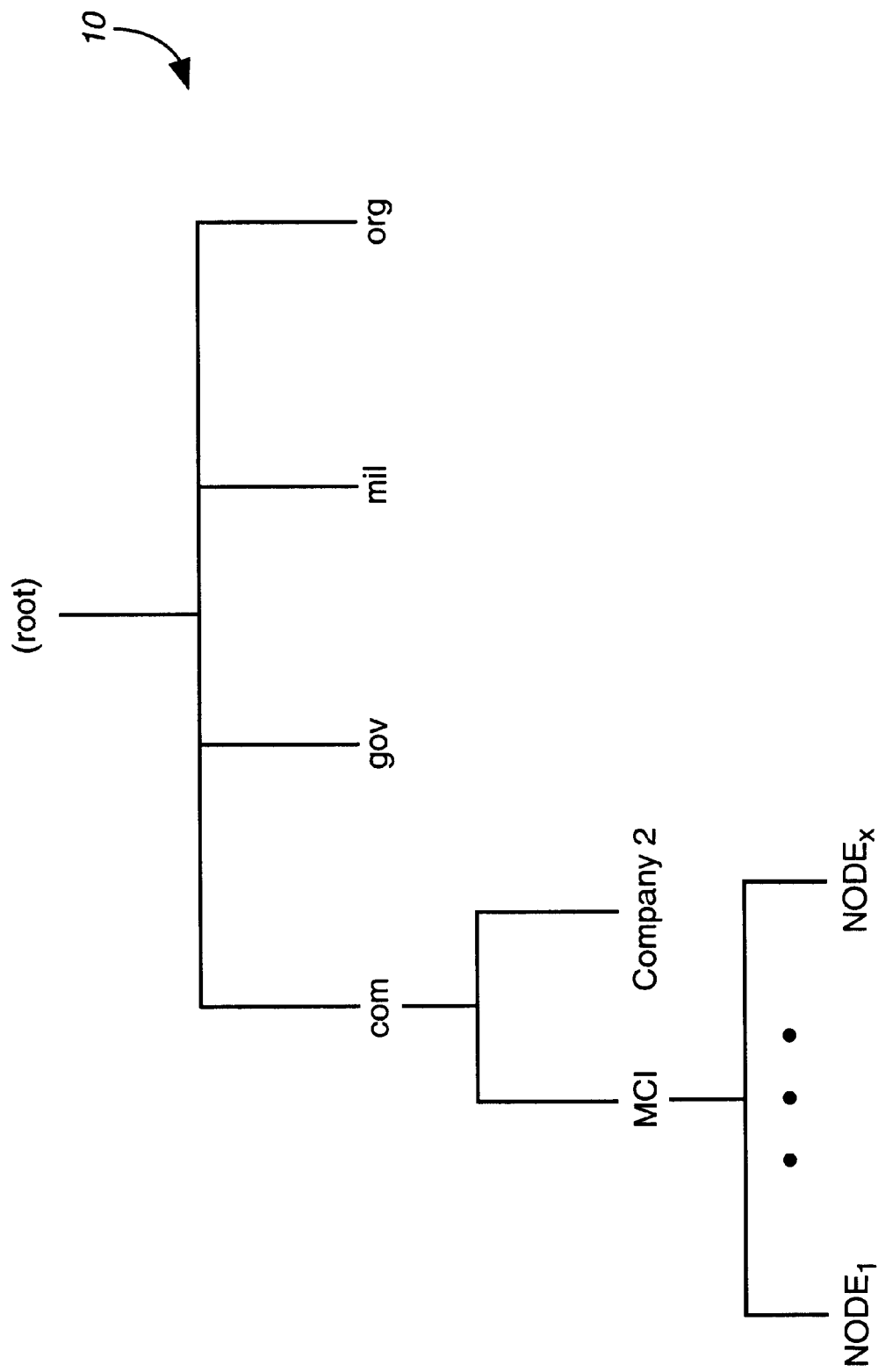
FIG. 1 illustrates an exemplary structure of a domain name space.
Figure 2:
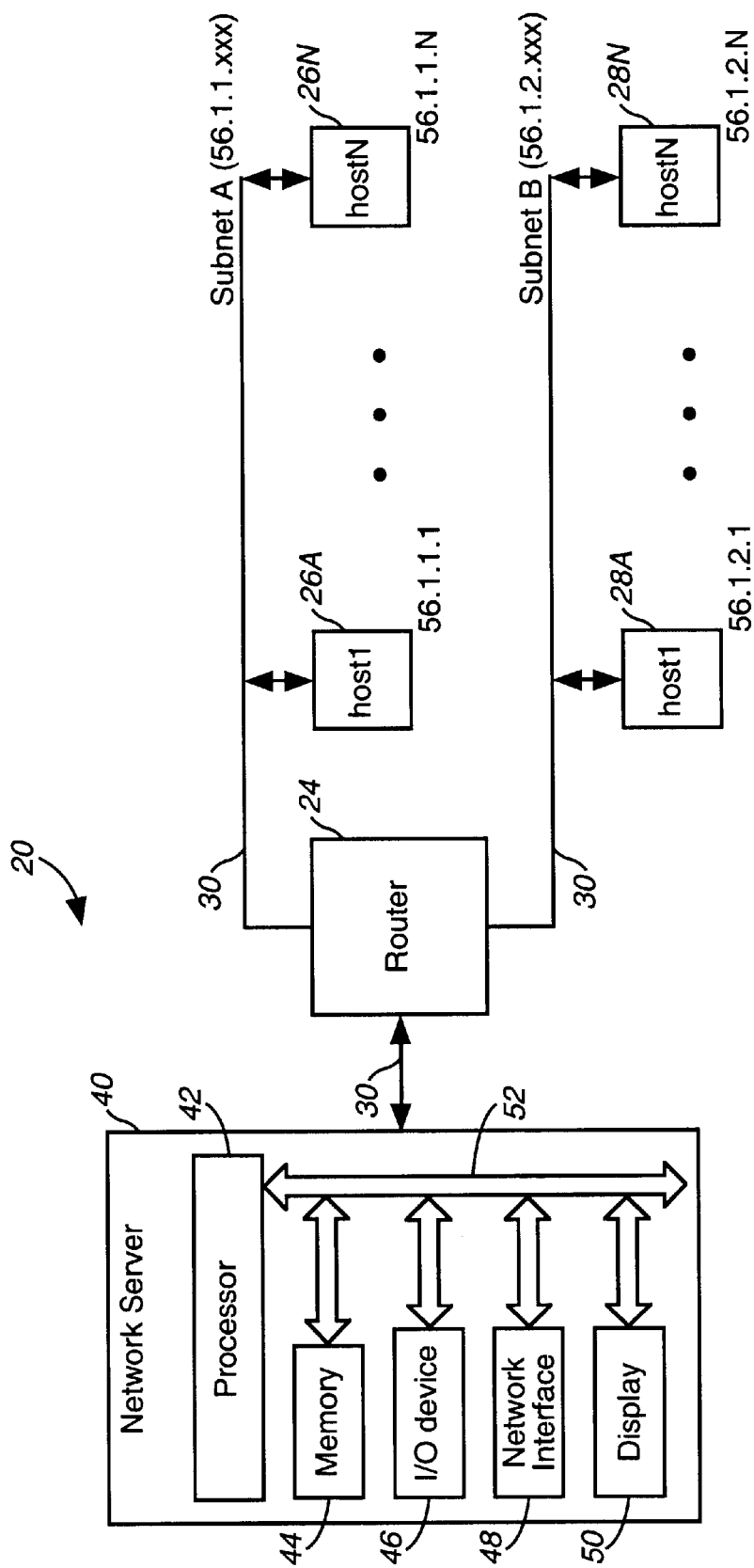
FIG. 2 illustrates an IP routed network used with a preferred embodiment of the invention.

FIG. 2 illustrates a typical configuration of an IP routed network 20 used with a preferred embodiment of the invention. The network 20 includes a network server 40 in communication with a router 24 by a communication medium 30. The medium 30 can be any wire, wireless, optical or other transmission link allowing communications between the server 40 and the router 24, as well as between the router 24 and hosts 26A–26N, 28A–28N or any other equipment included in the network 20. It must be noted that the precise architecture of the network 20 is not important and that this embodiment of the invention may be used with any IP routed network configuration.

The server 40 includes a processor 42 and memory 44 which is sufficient to store the DNS database and program instructions. The server also includes a network interface 48 required to operate the communications of the network 20. The server 40 may also include an input/ouput device 46 and a display 50. The components of the server 40 communicate with the processor 42 over a bus 52.

The router 24 provides a path for communications (e.g., packet transmission) between the server 40 and subnet A/subnet B depending upon the IP address included in the communication. The first host computer 26A included in subnet A may, for example, have an IP address of 56.1.1.1, while the last host computer 26N of subnet A may have an IP address of 56.1.1.N (where N is a number between 2 and 254). Accordingly, subnet A will have IP addresses 56.1.1.xxx which are recognized by the router 24 and the server 40. The first host computer 28A included in subnet B may, for example, have an IP address of 56.1.2.1, while the last host computer 28N of subnet B will have an IP address of 56.1.2.N (where N is a number between 2 and 254). Accordingly, subnet B will have IP addresses 56.1.2.xxx which are recognized by the router 24 and the server 40. If another host computer 28N+1 (not shown) were to be added, a new unique host name and IP address must be stored in the DNS database before other computers can communicate with new host computer 28N+1.

Figure 3:
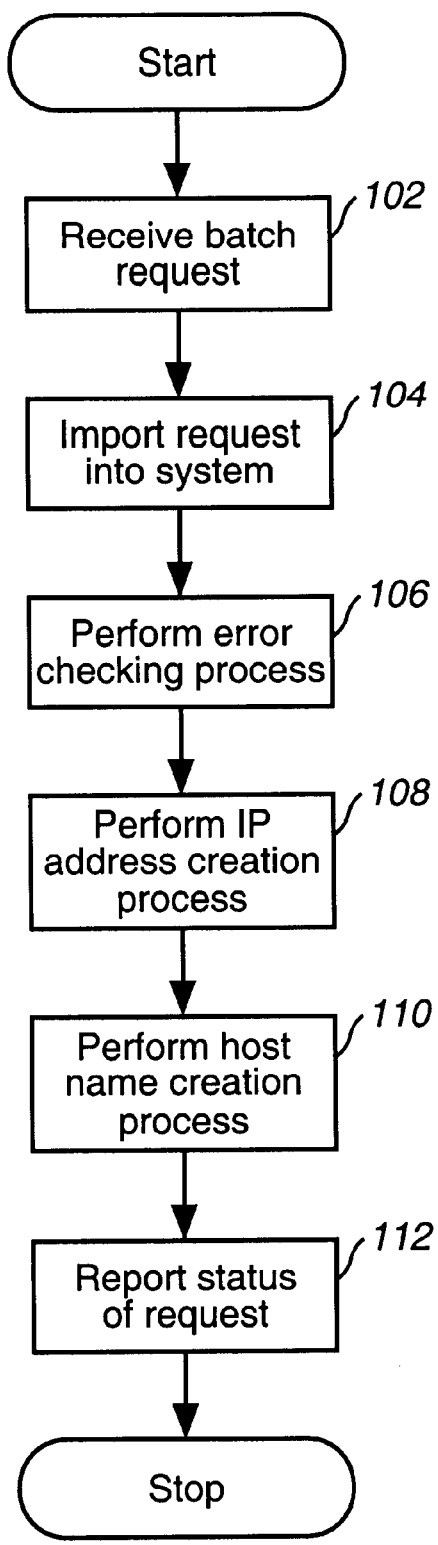
FIG. 3 is a flowchart depicting the operation of a preferred embodiment of the invention.

In accordance with a preferred embodiment of the invention, a new unique host name and IP address can be automatically assigned and stored into the DNS database of the network server 40. FIG. 3 is a flowchart illustrating an operation of a preferred embodiment of the invention in the form of an Internet Protocol address management system. The management system may be in the form of a computer program to be run on server 40 (FIG. 2) or any other processor. In the alternative, the management system may take the form of a stand-alone computer or computer network independent of the network containing the requested new host name/IP address. As will be described below in detail, the management system receives requests for a host name/IP address assignment and automatically performs error checking on the request.

In the error checking process, the system determines if there is available address space in the address space reserved for the requested subnet. The system also determines if the new host name meets the requisite criteria for a valid host name. Once passing the error checking process, the requested amount of IP addresses are created and inspected for uniqueness. Individual host names are created and inspected for uniqueness prior to being assigned to respective IP addresses. Once assigned, the new host names/IP addresses are entered into the DNS database.

Initially, the system receives a request for a host name/IP address assignment (step 102). The request may be received in any number of ways. For example, the request can be received via an e-mail message as a text message or with an attached file. Typically with bulk requests, the attached file will be a spreadsheet or the like that is (or requires conversion to be) compatible with the DNS database. The request can be received from a user data entry program or script that may be accessible through the Internet (e.g., through a Web page), company Intranet, or other area network, whose results are directly passed to the system. After the Web page entry of a request, for example, the Web server running the data entry script will generate and send a spreadsheet that is also compatible with the DNS database.

Regardless of the form used by the requester, the request must include certain information or parameters necessary for the system to generate appropriate names/addresses. In the preferred embodiment, for example, the request must include an identification of the subnet (or its address space) for which the new assignment is to be requested. If unknown to the requester, the identity or IP address of a router or another piece of equipment included in the subnet can be used. The request must also include the number of new assignments requested. In addition, the request may include other information required to generate a valid host name in accordance with predetermined guidelines or required criteria for generating unique host names such as, for example, the type of equipment being added to the subnet, or a city or state name in which the subnet or new equipment is located. As an alternative, the requester may provide a proposed host name, but as will be described below, the host name may not be used if it does not comply with the network's host name guidelines or requirements.

When the received request is in a compatible spreadsheet file form, the file is directly (or after modification) imported into the system as a temporary record (step 104). Once the information is imported into the system, the operation continues at step 106 where the information submitted with the request is error checked.

Figure 4:
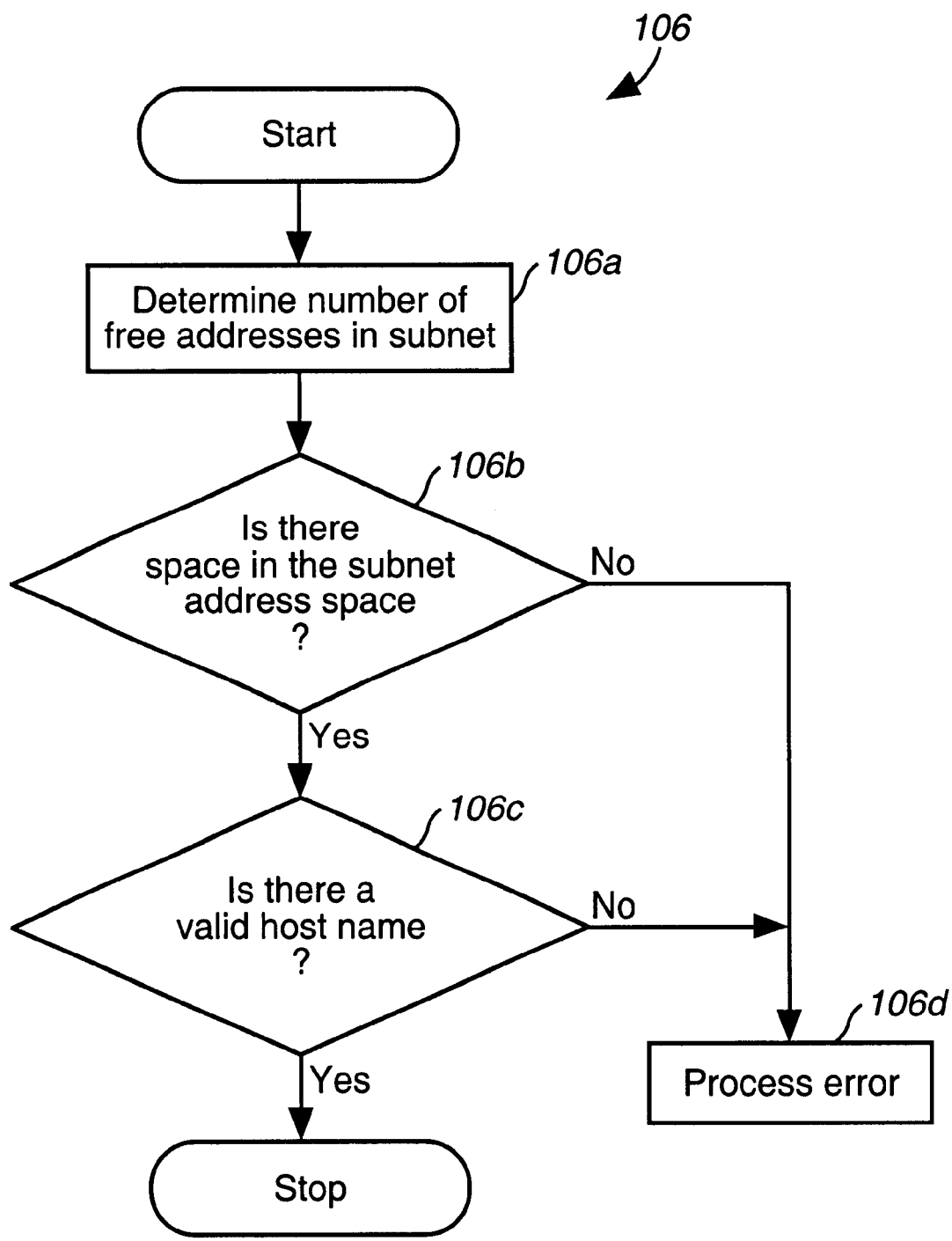
FIG. 4 is a flowchart illustrating an error checking process used in the embodiment illustrated in FIG. 3.

FIG. 4 illustrates a preferred embodiment of the error checking process 106 performed by the system to ensure the validity of the request. Initially, the request is checked to see if address space in the DNS database reserved for the requested subnet has enough space to fulfill the request (steps 106a and 106b). That is, the database is inspected to see how many IP address are available within the requested subnet address space (step 106a). At step 106b, it is determined whether the requested subnet has as many unassigned IP addresses as the number of new IP addresses requested to be added to the subnet.

If there is enough space in the subnet address space, the process 106 continues at step 106c where the proposed host name, if supplied, is error checked. That is, the requested host name is compared to any guidelines or criteria required by the network for a host name to be valid. (It must be noted that step 106c would not be required if there are no network criteria for a valid host name.) The criteria for a requested host name is application specific and, therefore, step 106c may be altered in the manner in which the proposed host name is validated. For example, if the network requires that the host name include the city and state where the new equipment is located, the requested host name will be analyzed to see if this information is correctly included. If the requested host name is valid, or if no host name is requested, the process 106 is completed and the system operation continues at step 108 where new IP addresses are generated.

If the subnet address space does not have enough available addresses to fulfill the request (step 106a) or if the requested host name is invalid (step 106c), the process 106 continues with error processing at step 106d. If the error is detected because there was not enough available addresses in the subnet address space, a determination of how many of the number of requested addresses can be entered into the available subnet address space is made. Once this determination is made, a determination is made whether a new address space can be created for the requested subnet. If there is a sufficient capacity to create a new address space for the subnet, the request is altered such that the maximum number of requested addresses that can be filled from the original subnet address space while the remaining requested addresses can be filled from the new subnet address space. Once altered, the error checking process 106 may be rerun on the modified request to ensure that there are no other errors with the request.

If the error processing was required because of an invalid proposed host name, one the following procedures will occur at step 106d. The request will be altered to remove the proposed host name since a new host name will be generated by the system at step 108 (described below). Once the invalid host names are removed, the error checking process 106 may be rerun on the modified request to ensure that there are no other errors with the request. Alternatively, the proposed host name can be manually altered to comply with the network's criteria. Once the host names have been altered, the error checking process 106 may be rerun on the modified request to ensure that there are no other errors with the request.

Figure 5:
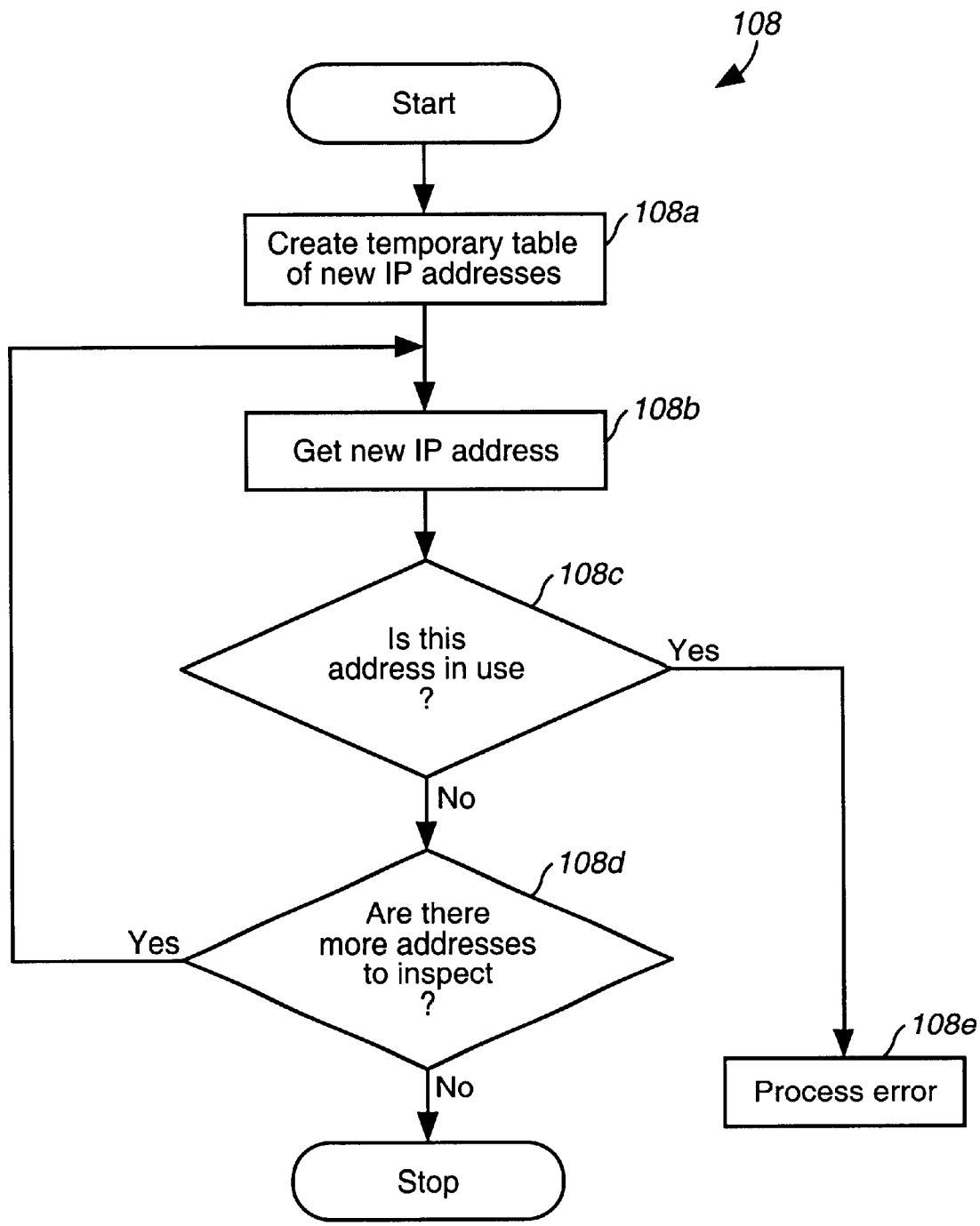
FIG. 5 is a flowchart illustrating an IP address creation process used in the embodiment illustrated in FIG. 3.

Upon successful completion of the error checking process 106, the system operation continues at step 108 (FIG. 3) where the requested new IP addresses are created. FIG. 5 is a flowchart illustrating the IP address creation process (step 108) performed by the system to ensure the validity of the newly created IP addresses. Initially, at step 108a, the request is inspected to determine the number of IP addresses to be generated for the requested subnet. The DNS database is then queried to determine the available addresses, new IP addresses are created accordingly, and placed into a temporary table. Once created, the temporary table may be compared to the DNS database to provide an additional check to ensure that all of the newly created IP addresses are not being used (steps 108b to 108d). In step 108b, a new IP address is selected from the temporary table. If the new IP address being inspected is not already in use (step 108c), the system determines if there are more addresses in the temporary table (step 108d) and, if so, a new IP address will be pulled from the temporary table and inspected at step 108b. When there are no more new IP addresses in the temporary table, the process step 108 is complete. If any of the new IP addresses are currently in use (that is, there is an entry in the DNS database for the new IP address), an error process is performed (step 108e). The error process (step 108e) may require a manual inspection by the DNS administrator to determine the error and the appropriate response before the system can proceed with the creation of host names.

Figure 6:
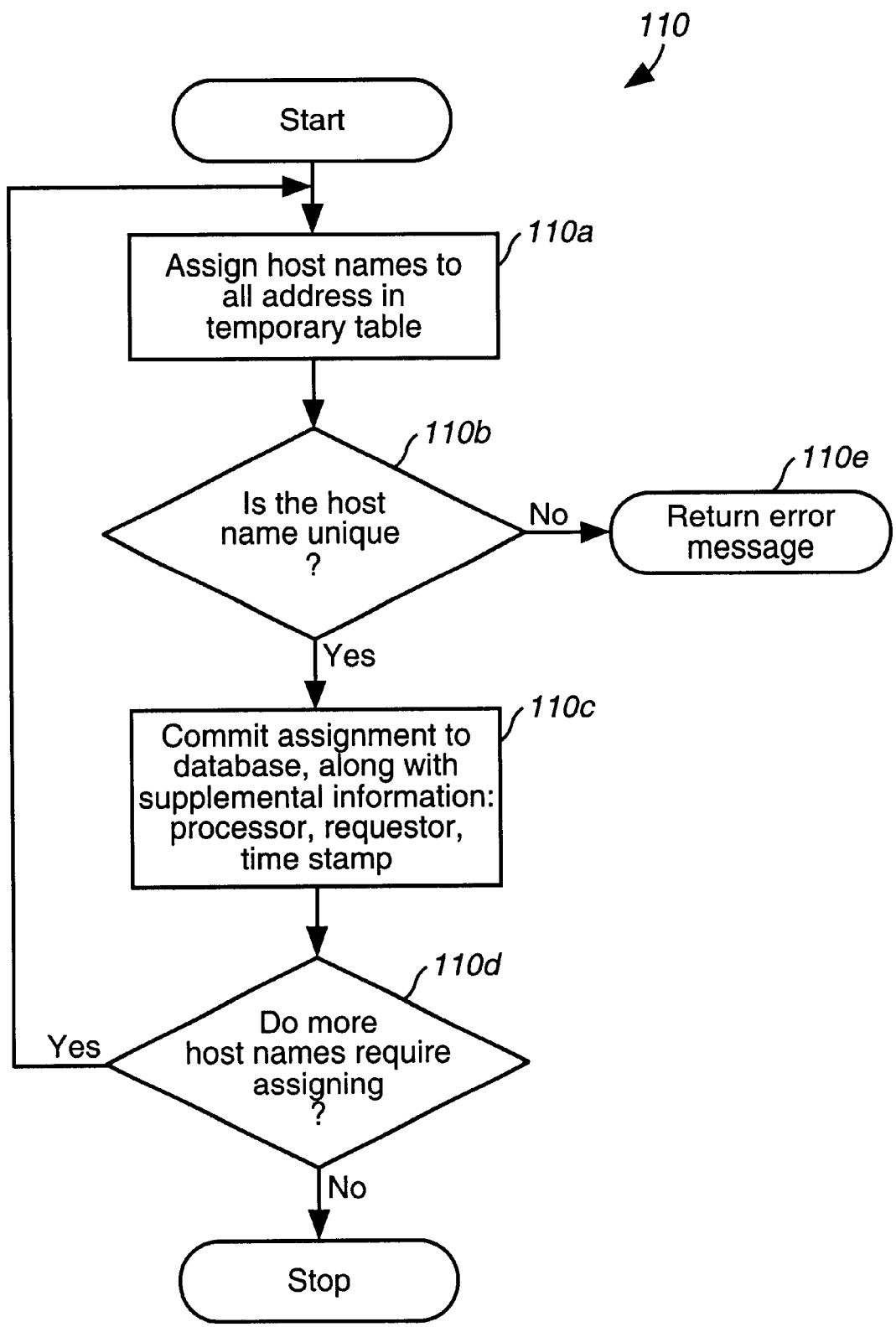
FIG. 6 is a flowchart illustrating a host name creation process used in the embodiment illustrated in FIG. 3.

Once all of the newly created IP addresses are cleared, then the process (step 108) is complete and the system operation continues at step 110 (FIG. 3) where host names are created and assigned to the new IP addresses. FIG. 6 is a flowchart illustrating the host name creation process 110 performed by the system to create and assign valid host names to the newly created IP addresses (created by the IP address creation process step 108). The system of the invention is capable of handling a network's particular criteria for creation of a valid host name. As stated earlier, a host name for a host computer named "host1" residing on the "mci.com" network could have the host name "host1.mci.com." It could also have "tom23.mci.com" as a host name. Although "host1.mci.com" and "tom23.mci.com" are proper host names, they may not reveal enough information about host1 as an administrator would like. The network administrator may, for example, want to know where host1 is physically located or whether host1 is a workstation or a network printer. Accordingly, the administrator may place specific criteria on valid host names to reveal more information about the host. The system can incorporate this criteria into its host name creation process to comply with the criteria, as shown in the following example.

Figure 7A:
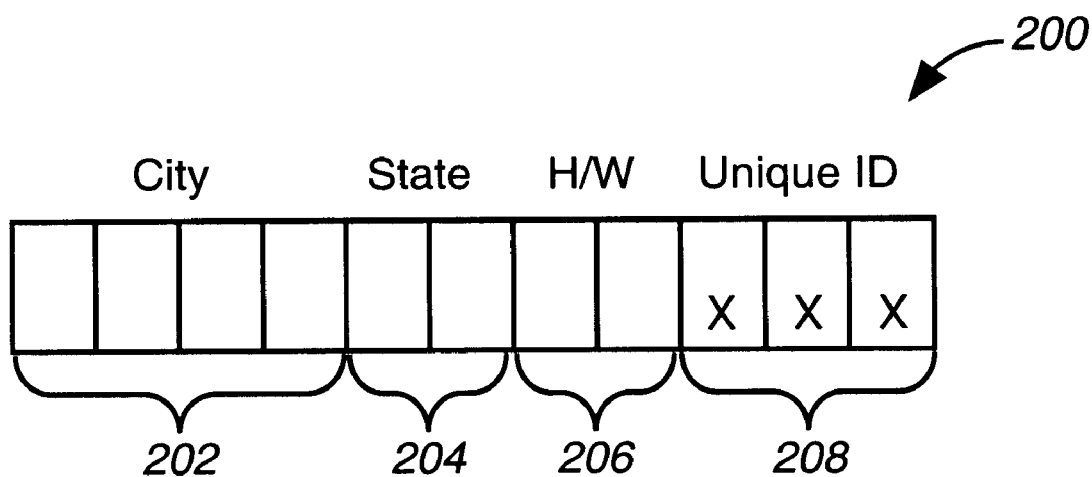
FIGS. 7a and 7b illustrate the format of a valid host name generated in accordance with a preferred embodiment of the invention.

The following example is used for illustration purposes only and is used as an aid in understanding the host name creation process (step 110) of the system of the invention. For this example, the network administrator has mandated that host names used in its network will have a prefix that can only be 11 characters long. FIG. 7a illustrates the prefix 200 and its constituent parts 202, 204, 206, 208 as used in this example. The prefix 200 is then attached to the suffix "mci.com" 210 to form the host name 220 (that is, "<prefix>.mci.com"). The administrator has mandated that: the first part 202 must be four characters representing the city where the host is located; the second part 204 must be two characters representing the state where the host is located; and the third part 206 must be two characters representing the type of hardware/equipment the new host name will represent. The three parts 202, 204, 206 will each have a respective set of alphanumeric codes representing valid entries for its part. The fourth part 208 must be a unique ID to prevent similar hosts in the same location from having duplicate names.

Figure 7B:
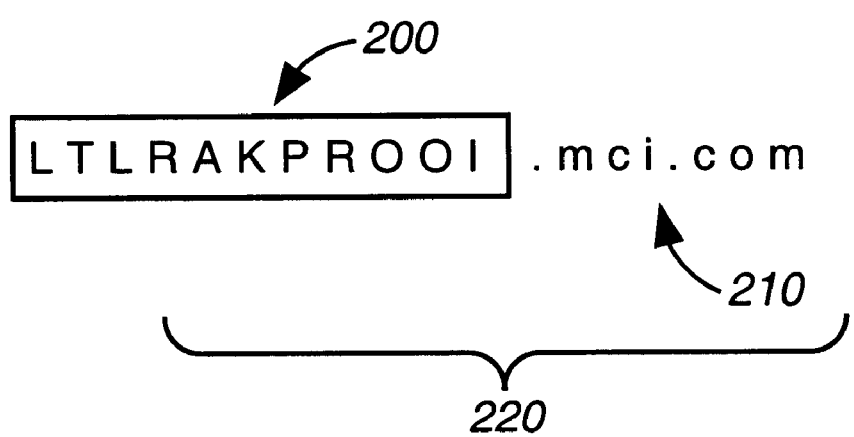

Referring to FIGS. 6–7b, the host name creation process 110 begins at step 110a where a host name is created according to the criteria illustrated in FIG. 7a. In step 110a, valid entries for the prefix 200 are selected from lookup tables or like storage devices used in the system based on information included in the request such as the city, state, and hardware specifics of the new host. If this information is not given in the request, the information may be gathered from prior host names within the requested subnet, if available. If the information cannot be found, the system may offer a prompt to manually enter the information. It must be noted that the administrator can also monitor the process on the display 50 (FIG. 2) if it is so desired. Once the first three parts 202, 204, 206 of the prefix 200 are created, the unique ID of the fourth part 208 is generated. In the preferred embodiment, the unique ID 208 is an alphanumeric sequence output from a counter that is incremented every time a unique host name is created. FIG. 7b illustrates a newly created host name 220 "ltlrakpr001.mci.com" generated from the prefix 200 "ltlrakpr001." Following the criteria mandated by the administrator, it is apparent that the host name 200 "ltlrakpr001.mci.com" implies that the new host or node is a printer (pr) connected to the mci.com network in Little Rock (ltlr), Arkansas (ak). As stated above, this is only an example and the host name and relevant criteria are entirely application dependent.

Once the host name is created (step 110a), the database is examined to ensure that the newly created host name is unique (step 110b). If the host name is unique, it and its associated IP address are immediately entered into the DNS database (step 110c). At this point, supplemental information concerning the new host name and IP address may also be entered into the database. Examples of this supplemental information include: the names of the requester and administrator; the time the request was processed (also known as a "time stamp"); and any other information desired. Step 110d determines if there are more host names to assign. If there are more host names to create and assign, the process continues at step 110a. Otherwise the process is completed, the request is terminated, and the database is updated with the new host name/IP assignment. If in step 110b it is determined that the new host name is not unique (that is, there is an existing entry in the DNS database bearing the new host name), the system performs error processing (step 110e). This error may require a manual inspection by the DNS administrator to determine the error and the appropriate response before the system can proceed with this request.

Once the host name creation process (step 110) is successfully completed, the system operation continues at step 112 where optional status tracking and reporting may be performed. A status report, for example, may include the newly created host names and IP addresses sent back to the requester or requesting host. The report may also include additional information deemed relevant by the administrator such as the time stamp when the request was processed. Preferably, the report may be sent to the requester via e-mail, fax, mail, Web posting, or any communications medium known.

It must be noted that the system of the invention can be run on any computer if programmed to execute the steps described herein. The program may be recorded on any type of storage medium (e.g., magnetic, optical, semiconductor, bubble, etc.) or implemented in hardware/firmware. As long as the current DNS database stored on the network server is accessed and updated by the system while performing the operations described herein, the system and the server may be deployed in independent networks, even utilizing different protocols. In addition, the system operation can be performed such that manual intervention is required by the administrator prior to performing all or any of the steps if it is so desired.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer-implemented method of assigning network protocol addresses and corresponding network protocol names to be used on a main network, the method comprising the steps of:

receiving a request for a plurality of new network protocol address/name assignments, said request including at least a subnet address, a hostname generation parameter, and a number of requested assignments;

generating a plurality of unique network protocol addresses within the subnet address corresponding to said number of assignments requested;

generating a plurality of unique network protocol names, based on the hostname generation parameter, corresponding to said number of assignments requested; and assigning each unique network protocol name to respective ones of said unique network protocol addresses.

2. The method according to claim 1, further comprising the step of importing said request as a temporary record.

3. The method according to claim 1, further comprising the steps of:

scanning a database to determine a number of available network protocol address locations that may be used for said subnet; and comparing said number of assignments requested to said number of available network protocol addresses.

4. The method according to claim 3, further comprising the steps of:

if said number of assignments requested is greater than said number of available network protocol addresses determined in said scanning step, scanning said database to locate a second subnet address space having available addresses;

calculating a number of requested assignments remaining after filling all available addresses in an original subnet address space;

modifying said request to include a number of assignments for said original subnet address space and a number of assignments for said second subnet; and rerunning said step of validating on said request after being modified in said modifying step.

5. The method according to claim 4, wherein said remaining number of assignments requested to be stored in said second subnet address space are a number of assignments that can not be entered into said original subnet address space; and wherein said database is a Domain Name System (DNS) database storing host names for the network, together with correlated network protocol addresses.

6. The method according to claim 4, further comprising the step of generating an error indication; and wherein said network protocol is an Internet Protocol (IP).

7. The method according to claim 1, further comprising the step of validating said request to ensure that a requested host name is valid, wherein a requested host name is valid if the requested host name complies with predetermined guidelines.

8. The method according to claim 7, further comprising the steps of:

if said requested host name is invalid, deleting said invalid host name from said request; and revalidating said request to ensure that a requested host name is valid.

9. The method according to claim 7, further comprising the steps of:

if said requested host name is invalid, modifying said request to replace said invalid host name with a valid host name; and rerunning said validating step to ensure that a requested network protocol name is valid.

10. The method according to claim 7, further comprising the step of generating an error indicating if said requested host name is invalid.

11. The method according to claim 1, wherein said step of generating a plurality of network protocol names comprises:

concatenating at least one field, based on the host name generation parameter, corresponding to host name criteria of said network protocol routed network to a unique identifier field to form a prefix of a host name; and concatenating said prefix to a suffix of said host name corresponding to a domain of said network protocol routed network to form a host name.

12. The method according to claim 1, further comprising the step of displaying results of said assignments on a display.

13. The method according to claim 1, wherein said request is received from a host, said method further comprising the step of sending results of said assignments to said host.

14. The method according to claim 1, wherein said request is received in an e-mail message.

15. The method according to claim 1, wherein said request is received as an attachment to an e-mail message.

16. The method according to claim 15, wherein said attachment is in a spreadsheet form.

17. The method according to claim 1, wherein said request is received from a Web site linked to said network protocol routed network.

18. A computer readable storage medium containing a computer readable code for operating a computer to perform a method of assigning network protocol addresses and corresponding network protocol names to be used on a main network, the method comprising the steps of:

receiving a request for a plurality of new network protocol address/name assignments, said request including at least a subnet address, a host name generation parameter, and a number of requested assignments;

generating a plurality of unique network protocol addresses within the subnet address corresponding to said number of assignments requested;

generating a plurality of unique network protocol names, based on the host name generation parameter, corresponding to said number of assignments requested; and assigning each unique network protocol name to respective ones of said unique network protocol addresses.

19. The computer readable storage medium according to claim 18, wherein said method further comprises the step of importing said request as a temporary record.

20. The computer readable storage medium according to claim 18, wherein said method further comprises the steps of:

scanning a database to determine a number of available network protocol address locations that may be used for said subnet; and comparing said number of assignments requested to said number of available network protocol addresses.

21. The computer readable storage medium of claim 20, wherein said method further comprises the steps of:

if said number of assignments requested is greater than said number of available network protocol addresses determined in said scanning step, scanning said database to locate a second subnet address space having available addresses;

calculating a number of requested assignments remaining after filling all available addresses in an original subnet address space;

modifying said request to include a number of assignments for said original subnet address space and a number of assignments for said second subnet; and rerunning said step of validating on said request after being modified in said modifying step.

22. The computer readable storage medium of claim 21, wherein said remaining number of assignments requested to be stored in said second subnet address space are a number of assignments that can not be entered into said original subnet address space; and wherein said database is a Domain Name System (DNS) database storing host names for the network, together with correlated network protocol addresses.

23. The computer readable storage medium of claim 21, wherein said method further comprises the step of generating an error indication; and wherein said network protocol is an Internet Protocol (IP).

24. The computer readable storage medium according to claim 18, wherein said method further comprises the step of validating said request to ensure that a requested host name is valid, wherein a requested host name is valid if the requested host name complies with predetermined guidelines.

25. The computer readable storage medium according to claim 24, wherein said method further comprises the steps of:

if said requested host name is invalid, deleting said invalid host name from said request; and revalidating said request to ensure that a requested host name is valid.

26. The computer readable storage medium according to claim 24, wherein said method further comprises the steps of:

if said requested host name is invalid, modifying said request to replace said invalid host name with a valid host name; and rerunning said validating step to ensure that a requested network protocol name is valid.

27. The computer readable storage medium according to claim 24, further comprising the step of generating an error indicating if said requested host name is invalid.

28. The computer readable storage medium according to claim 18, wherein said method step of generating a plurality of network protocol names comprises:

concatenating at least one field, based on the hostname generation parameter, corresponding to host name criteria of said network protocol routed network to a unique identifier field to form a prefix of a host name; and concatenating said prefix to a suffix of said host name corresponding to a domain of said network protocol routed network to form a host name.

29. The computer readable storage medium of claim 18, wherein said method further comprises the step of displaying results of said assignments on a display.

30. The computer readable storage medium of claim 18, wherein said request is received from a host, said method further comprising the step of sending results of said assignments to said host.

31. The computer readable storage medium of claim 18, wherein said request is received in an e-mail message.

32. The computer readable storage medium of claim 18, wherein said request is received as an attachment to an e-mail message.

33. The computer readable storage medium of claim 32, wherein said attachment is in a spreadsheet form.

34. The computer readable storage medium of claim 18, wherein said request is received from a Web site linked to said network protocol routed network.

35. An Internet address management system comprising:

means for receiving a request for a plurality of new network protocol address/name assignments, said request including at least a subnet address, a host name generation parameter, and a number of requested assignments;

means for generating a plurality of unique network protocol addresses within the subnet address corresponding to said number of assignments requested;

means for generating a plurality of unique network protocol names, based on the host name generation parameter, corresponding to said number of assignments requested; and means for assigning each unique network protocol name to respective ones of said unique network protocol addresses.

36. The system according to claim 35, further comprising means for importing said request as a temporary record.

37. The system according to claim 35, further comprising:

means for scanning a database to determine a number of available network protocol address locations that may be used for said subnet; and means for comparing said number of assignments requested to said number of available network protocol addresses.

38. The system according to claim 37, wherein said means for validating further comprises:

means for scanning said database to locate a second subnet address space having available addresses if said number of assignments requested is greater than said number of available network protocol addresses;

means for calculating a number of requested assignments remaining after filling all available addresses in an original subnet address space; and means for modifying said request to include a number of assignments for said original subnet address space and a number of assignments for said second subnet.

39. The system of claim 38, wherein said database is a Domain Name System (DNS) database storing host names for the network, together with correlated network protocol addresses.

40. The system of claim 38, wherein said means for validating further comprises means for generating an error indication, and wherein said network protocol is an Internet Protocol (IP).

41. The system according to claim 35, further comprising means for validating said request to ensure that a requested host name is valid, wherein a requested host name is valid if the requested host name complies with predetermined guidelines.

42. The system according to claim 41, wherein said means for validating said request to ensure that a requested host name is valid comprises means for deleting said invalid host name from said request.

43. The system according to claim 41, wherein said means for validating said request to ensure that a requested host name is valid comprises means for modifying said request to replace said invalid host name from said request.

44. The system according to claim 41, further means for generating an error indicating if said requested host name is invalid.

45. The system according to claim 35, wherein said means for generating a plurality of network protocol names comprises:

means for concatenating at least one field, based on the hostname generation parameter, corresponding to host name criteria of said network protocol routed network to a unique identifier field to form a prefix of a host name; and means for concatenating said prefix to a suffix of said host name corresponding to a domain of said network protocol routed network to form a host name.

46. The system according to claim 35, further comprising means for displaying results of said assignments on a display.

* * * * *